US012359800B2

(12) United States Patent
Gelten et al.

(10) Patent No.: US 12,359,800 B2
(45) Date of Patent: Jul. 15, 2025

(54) LUMINAIRE, STREET LIGHT, SYSTEM AND METHOD

(71) Applicant: SIGNIFY HOLDING B.V., Eindhoven (NL)

(72) Inventors: Ronald Johannes Gelten, Geldrop (NL); Rene Cornelis Reuser, Velp (NL); Jonathan Hardy, Eastman (CA); Oscar Hendrikus Willemsen, Den Bosch (NL); Khalid Kamran Aziz, Amsterdam (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/673,854

(22) Filed: May 24, 2024

(65) Prior Publication Data

US 2024/0318812 A1 Sep. 26, 2024

Related U.S. Application Data

(62) Division of application No. 18/272,881, filed as application No. PCT/EP2022/050934 on Jan. 18, 2022.

(30) Foreign Application Priority Data

Jan. 21, 2021 (EP) .................................... 21152760

(51) Int. Cl.
*F21V 23/04* (2006.01)
*F21S 2/00* (2016.01)
(Continued)

(52) U.S. Cl.
CPC .......... *F21V 23/0435* (2013.01); *F21S 2/005* (2013.01); *F21S 8/085* (2013.01); *F21V 33/00* (2013.01);
(Continued)

(58) Field of Classification Search
CPC ...... F21V 23/0435; F21V 33/00; F21S 2/005; F21S 8/085
See application file for complete search history.

(56) References Cited

U.S. PATENT DOCUMENTS

| | | | | |
|---|---|---|---|---|
| 9,726,360 | B1 * | 8/2017 | Alexander | H01Q 21/205 |
| 2007/0285912 | A1 * | 12/2007 | Lin | H01Q 1/06 362/4 |

(Continued)

FOREIGN PATENT DOCUMENTS

| | | | |
|---|---|---|---|
| CN | 108730788 | A | 11/2018 |
| CN | 210372924 | U | 4/2020 |
| CN | 212056886 | U | 12/2020 |

OTHER PUBLICATIONS

Seung-Jae Park, et al., "Improvement of Thermal Efficiency of a Radiant Heat Since with a Surrounding Structure", 12th International Conference on Heat Transfer, Fluid Mechanics and Thermodynamics, Seoul, Korea, Jul. 11-13, 2016, pp. 961-964.

*Primary Examiner* — Bryon T Gyllstrom

(57) ABSTRACT

A luminaire is provided comprising a luminaire housing, a light module, and a communication module. The light module comprises a light source for emitting light from the luminaire and wherein the light module is accommodated at least partly within the luminaire housing. The communication module is configured for wireless transmitting and/or receiving communication signals which are unrelated to the lighting function of the luminaire and/or to the operation of the light module. The communication module is accommodated within the luminaire housing.

12 Claims, 5 Drawing Sheets

(51) Int. Cl.

| | |
|---|---|
| ***F21S 8/08*** | (2006.01) |
| ***F21V 33/00*** | (2006.01) |
| ***F21W 131/103*** | (2006.01) |
| ***F21Y 115/10*** | (2016.01) |
| ***H01Q 1/22*** | (2006.01) |

(52) U.S. Cl.

CPC .... *F21W 2131/103* (2013.01); *F21Y 2115/10* (2016.08); *H01Q 1/22* (2013.01)

(56) References Cited

U.S. PATENT DOCUMENTS

| | | | | |
|---|---|---|---|---|
| 2009/0040750 | A1* | 2/2009 | Myer | F21S 9/037 136/246 |
| 2010/0296274 | A1* | 11/2010 | Yu | G02B 6/001 362/183 |
| 2013/0044488 | A1* | 2/2013 | Hreish | H05B 47/175 362/253 |
| 2016/0245492 | A1 | 8/2016 | Ando et al. | |
| 2016/0290578 | A1 | 10/2016 | Adkins | |
| 2018/0106466 | A1 | 4/2018 | Chan | |
| 2019/0301711 | A1 | 10/2019 | Adams et al. | |
| 2020/0375016 | A1* | 11/2020 | Hutson | H05B 41/40 |
| 2020/0383173 | A1* | 12/2020 | Aaron | H05B 45/12 |
| 2022/0254250 | A1* | 8/2022 | Saenz | B60W 50/14 |
| 2023/0408076 | A1* | 12/2023 | Gelten | F21V 23/0435 |

* cited by examiner

LUMINAIRE, STREET LIGHT, SYSTEM AND METHOD

CROSS-REFERENCE TO PRIOR APPLICATIONS

This application is a Divisional Application filing, which claims the benefits of European Patent Application No. 21152760.1, filed Jan. 21, 2021, International Application No. PCT/EP2022/050937, filed Jan. 18, 2022, and U.S. application Ser. No. 18/272,881, filed Jul. 18, 2023.

FIELD OF THE INVENTION

The present disclosure relates to a luminaire in particular a luminaire for outdoor lighting. The present disclosure further relates to a wireless communication infrastructure, in particular a wireless communication infrastructure leveraging existing outdoor lighting infrastructure.

BACKGROUND OF THE INVENTION

Availability and reliability of wireless communication services rely on, inter alia, the number and robustness of wireless connection points. An outdoor lighting grid (e.g. street lighting) may provide a suitable grid to deploy wireless connection points and create a wireless communication infrastructure (such as for WiFi, telecommunications 4G/5G, wireless backhaul and fronthaul) because it offers proximity (to people, traffic), scale (ubiquitous presence), granularity (distance between poles matches typical requirements of radio-frequency (RF) network design) and elevation (height to mount equipment for signal coverage).

In view of that, several suppliers have developed communication devices to be attached to street light poles. Communication devices may typically include following key building blocks: a controller board, a modem and an antenna. For lower frequencies (below ~7 GHZ), these building blocks can be physically separated. For higher frequencies, physical separation between the modem and antenna may need to be minimized. For all communication devices, power dissipation of these devices tends to require significant heat sinking capacity. Traditional methods of heat sinking use a profiled metal mass (e.g. having cooling fins) to spread the heat and subsequently transfer the heat to the environment via radiation and convection. The currently available devices therefore pose a significant size and weight to be attached to the light poles. Next to aesthetic objections, this may lead to technical problems related to strength of the light poles such as weight (distribution) and/or wind load on the devices creating forces on the poles above rated values and/or legislative limits.

As a consequence, improvements are desired.

SUMMARY OF THE INVENTION

In view of the considerations above, a luminaire is provided comprising a luminaire housing, a light module, and a communication module. The light module comprises a light source for emitting light from the luminaire and the light module is accommodated at least partly within the luminaire housing. The communication module is configured for wireless transmitting and/or receiving communication signals which are unrelated to the lighting function of the luminaire and/or to operation of the light module. The communication module is accommodated within the luminaire housing. At least one power supply and an LED driver (see below) may be provided to provide low-voltage direct-current (DC) power to the light module. The same power supply or alternatively one or more other power supplies, e.g. via a power over ethernet (POE) connection, may provide power to the communication module or external devices.

Thus, the communication module is integrated into the luminaire. This obviates providing the communication module as an additional structure on a support for the luminaire, such as a street pole. For example, it obviates drilling holes into the support and/or providing other fixtures to mount the communication module onto. It may also obviate installation of power supplies and related cabling on or in the support. It may also allow closer adherence to aesthetic and technical design specifications for the support such as weight and drag of the support, its luminaire and optionally other peripherals.

At least part of the communication module may be covered by the luminaire housing to shield the communication module from weather influences; this may obviate at least part of a separate housing for the communication module, therefore reducing weight and drag.

A luminaire housing may integrate multiple functions such as mechanical, thermal and protective functions. For example, a luminaire housing may provide mechanical strength, integrity, attaching to a pole, attaching devices/components internally and externally, providing electrical feedthroughs and connectors, etc. The structure providing this function is often made from metal or other (composite) material with similar mechanical properties. As another example, a luminaire housing may thermally distribute, conduct and radiate heat, but also sometimes insulate portions or internal devices/components against heat generated elsewhere e.g. outside the luminaire. As a further example, a luminaire housing may protect the luminaire's internal devices/components against external influences such as weather influences and may serve an aesthetic purpose i.e. a design purpose. For this, the luminaire housing may comprise multiple parts, each fulfilling one or more of the above mentioned functions. For example, the luminaire housing may comprise a protective and/or aesthetic cover and a mechanical frame, with at least part of the cover covering at least part of the frame. The cover may determine at least part of the outer shape and/or finish of the luminaire. The cover may only partially cover the frame, meaning that some portions of the frame may not be covered and therefore become part of the outer shape and/or finish of the luminaire. At least part of the cover may be opaque and shield the communication module, and possibly the at least part of another portion the luminaire housing, from view.

Integrating the communication module in the luminaire may reduce the increase of the effective projected area (EPA) of such integrated solution compared to the combined effective projected area (EPA) of two separate devices and thus reduce wind load, further increasing robustness.

Also or alternatively, the integrated solution may render the communication module less visible and/or more aesthetic compared to providing a separate luminaire and separate communication device. This may increase acceptance by the public and/or municipalities for a dense public communication infrastructure.

The light source may comprise one or more light emitting diodes ("LEDs"). LEDs may provide increased durability and/or energy efficiency compared to other types of light sources. Also, LEDs have a smaller volume and/or form factor compared with conventional light sources and therefore may release occupied space in existing luminaires when retrofitting these luminaires from conventional light sources to LED light sources, allowing this space to be reused for providing the communication module in the luminaire. In addition, the energy efficiency of LEDs reduces consumed power of the luminaire in comparison with other types of light sources. This enables retrofitting an existing luminaire with, and/or addition to an existing luminaire of, other power consuming devices, such as communication devices, without adverse effects of mains wiring to the pole, such as voltage drop or exceeding wiring specifications.

As explained in more detail below, the light module may further comprise one or more additional parts for operation and/or control of the light source and/or the light emitted or to be emitted from the luminaire, such as one or more of a light driver, a power source, a lighting controller, a lighting network module, and a transmitter and/or receiver connected with one or more of the light driver, the power source, the lighting controller and the lighting network module for operating the light.

The communication module may form at least part of a node of a (tele-) communication network. The communication module may provide an access point for external devices which may or may not be mobile, e.g. for fixed wireless access and/or mobile phone access. The communication module may provide physical connection points for external devices, such as RJ45 ethernet connectors and/or optical fiber connectors. Such connection points may provide power as well as data connections, as in the case of power over ethernet (POE) connections. A data and power connection may be integrated in the communication module, or may be a separate unit integrated in the luminaire.

The communication signals being unrelated to the lighting function of the luminaire and/or to operation of the light module facilitates independent optimization of the light module for its lighting functionality and optimization of the communication module for its non-lighting related communication signals. The light module may be devoid of signal processing means (e.g. devoid of a receiver and/or a transmitter) or may be configured for transmitting and/or receiving signals associated with operation of the light module per se, e.g. light source status data to a maintenance log or light source settings from a lighting management system. The communication module and the light module may be functionally fully separate from each other. E.g. the light module and/or the communication module may operate independently, devoid of any communication between the light module and the communication module.

However, also in such case, the communication module and the light module may share at least part of a power distribution system, e.g. both being connected to a single electrical power source and/or power line. This may simplify installation of the communication module into the luminaire and/or facilitate operation of the communication module and the light module from a single secure, power supply.

The communication module may comprise an emitter and a receiver of communication signals. The communication module may have any suitable construction and may comprise, e.g. a controller board, a modem and one or more antennas, for radio signals of any suitable wavelength range. Such communication modules may for example comprise one or more mm Wave communication modules. Also or alternatively, the communication module may be configured for optical communication signals and may then comprise, e.g. a controller, a (laser) light source, an optical detector, and suitable optics such as lenses, mirrors, filters, modulators, etc. Such communication modules may for example be used for free space optical communication. Note here, that "light" and/or "optical" may refer to any electromagnetic wavelength or wavelength range in visible and/or infrared light, such as in a wavelength range of 0.4-2.5 micrometers, in particular a near-infrared wavelength range of 0.7-2 micrometers, e.g. 1-1.7 micrometers such as 1.2-1.5 micrometers.

The luminaire may be functionally and/or physically divided in two sections: a light emitting section and power supply section, which may be functionally linked by at least part of the light module. The light emitting section and the power supply section may also be physically separated by at least part of the light module, e.g. a substrate supporting the light source and/or light source driver. The communication module may be accommodated within the light emitting section or within the power supply section. When accommodated within the light emitting section, the communication module may be arranged in a non-emitting side of the light emitting section, e.g. at a "backside" of an LED board ("backside" being the side opposite of the side where the LEDs are mounted), or behind an opaque luminaire housing part of a luminaire (i.e. outside the optical path of the light emitting section).

The light source may be arranged at a light emitting side of the light module or the communication module may be arranged opposite the light emitting side of the light module, the opposite side being opposite to the light emitting side.

Also or alternatively, the luminaire may comprise a light directing structure defining a light emission direction and the communication module may be arranged in the luminaire housing at an opposite side of the light direction structure relative to the light emission direction.

Thus, the communication module preferably does not affect the light emission by the luminaire. Also, the communication module may be at least partly obscured by the light module and/or the light directing structure, in particular in overhead lighting such as in streetlights, thereby being less visible and/or more aesthetically pleasing. The light directing structure may be defined by and/or be provided by at least one of the light source itself, a light source mount, a lens and a reflector. E.g., LEDs may tend to emit light in a particular light emission direction and/or over a limited solid angle. LEDs may be mounted on a substrate such as a circuit board onto which a LED may be surface mounted. The communication module may then be suitably arranged behind the substrate, relative to the light emitting side of the substrate. Also or alternatively, the communication module and at least part of the light module, e.g. the light source, may be arranged adjacent each other, the luminaire comprising as a light directing structure a reflector for reflecting light from the light source in a light emission direction, and the communication module being arranged outside the optical path of the reflector with respect to incident and/or reflected light. In some cases, at least part of the light module and/or the communication module may be configured to provide thermal insulation between the modules. E.g. a reflector of the light module for reflecting light from the light source may also reflect thermal radiation and thus may prevent thermal crosstalk between at least part of the light module and the communication module. Note that a light emission direction may also or alternatively be determined by one or more lenses, which may at least in part be integrated in/with the light source.

The luminaire housing may comprise a transmissive housing part, being transmissive for the communication signals.

This may facilitate or simplify covering and protecting the communication module or at least the transceiver part of the communication module (e.g. the antenna or optical transceiver) from external influences, such as the weather in case of an outdoor luminaire. A transmissive housing part may be integrated in a cover of the luminaire housing or be formed as a 'window' in the luminaire housing having a better transmissibility than other parts of the luminaire housing. E.g. the transmissive housing part may be relatively thinner than other luminaire housing portions and/or be at least partly of another material than other luminaire housing portions, e.g. the transmissive housing part may be of glass and/or a polymer material whereas the other luminaire housing parts are metallic. The luminaire housing may be entirely—or at least substantially—from a material that is transmissive for the communication signals, such as polymer in the case of mm Wave signals, in which case the entire luminaire housing, if made from polymer, may provide a 'window' for transmitting and receiving communication signals.

The transmissive housing part may be optimized for minimal signal loss by the choice of one or more of materials, thickness and surface structure. The transmissive housing part may comprise a window defined by a portion having locally elevated transmissibility for the communication signals, such as a portion of a different material, a portion of comparably thinner material than adjacent material and/or one or more apertures in the material.

The transmissive housing part may comprise a sequence of different materials in a direction of propagation of the signal, e.g. a laminate or stack of materials with mutually different dielectric properties or index of refraction n.

For each of the materials and, if applicable, for each of the materials in the sequence of materials, the transmissive housing part may have a material thickness, or average material thickness, d in the direction of propagation of the signal through the respective material which is an integer multiple of one half wavelength of the signal in the material, with a deviation less than 50% of one half wavelength: $d=m*0.5*\lambda+/-0.25*\lambda$, where m is an integer number, $\lambda$ is the wavelength of the communication signal in the material, d is average thickness in the direction of the signal propagation. Preferably, the deviation is less than 50% of one half wavelength, e.g. $<0.2*\lambda$, more preferably $<0.1*\lambda$. Also or alternatively, the transmissive housing part may comprise one or more material combinations and/or periodic or aperiodic refractive structures for reduction of signal dispersion and/or reflection. E.g., the transmissive housing part may be formed to conform to an antenna shape and/or a particular wave front profile, such as having a particular shape or profile.

A transmissive housing part may preferably have a transmissibility of better than 50% of the signal power, preferably better than 75% of the signal power, more preferably significantly better than 90% such as better than 95% of the signal power, or even better than 95%. Dispersion and/or reflection should also be prevented as much as possible.

The transmissive part of the housing may be opaque for visible light.

Thus the communication module may be particularly inconspicuous. Preferably, the entire housing is opaque, except for one or more optional windows and/or lenses through which the light from the light source is emitted, i.e. a light exit window of the luminaire.

The communication module may comprise one or more of signal emitters, signal directors and signal receivers, and the luminaire may comprise a mount for accommodating the communication module within the housing, such that each of the one or more of signal emitters, signal directors and signal receivers are aligned with the one or more transmissive housing parts.

Thus, the one or more of signal emitters, signal directors and signal receivers may be properly aligned to the luminaire housing to provide optimal signal transmission and reception with minimal signal loss. In particular since the position and/or orientation of a luminaire is typically well-defined with respect to a support, e.g., a street pole, and/or further surroundings, e.g., a street, this may also facilitate alignment of the one or more signal emitters, signal directors and signal receivers to further objects outside of the luminaire, e.g. further elements of a communication network such as further communication modules. The one or more signal emitters, signal directors and signal receivers may comprise one or more of antennas, reflectors, sensors, etc.

The provision of a mount for accommodating the communication module within the housing, in addition to and independent from the luminaire housing, may accommodate different structural demands for the mount and the housing, respectively, which may also allow or require different material properties, for instance with respect to one or more of strength, manufacturability and appearance.

The mount may comprise a transmissive mount portion being transmissive for the communication signals. The considerations above regarding the transmissive housing portion being transmissive for the communication signals equally apply to the transmissive mount windows.

The mount may define one or more transmissive mount windows being transmissive for the communication signals; and each of the one or more of signal emitters, signal directors and signal receivers, the one or more transmissive mount windows, and the one or more transmissive housing parts, when provided, may then be aligned. A transmissive window in the mount may be defined by a portion having locally elevated transmissibility for the communication signals, such as a portion of a different material, a portion of comparably thinner material than adjacent material and/or one or more apertures in the material.

Such a mount may facilitate providing mechanical strength for positioning and securing the communication module in the luminaire and transmissivity for communication signals at predetermined 'windows' in the mount. In addition to mechanical strength and transmissivity for communication signals, a mount may also provide heat sinking functionality for the communication module. Also or alternatively, directionality of the communication signals may be improved. E.g. the mount may at least in part surround the communication module and be substantially opaque for the communication signals, thereby shielding communication signals, in undesirable communication directions.

The communication module may comprise, e.g., several directional transceivers each providing a line of sight communication covering one or more of a particular beam shape, azimuthal angle or solid angle, e.g. for communicating with further communication modules in a particular direction and/or range, which further communication modules may be arranged at different locations and/or different heights and/or be moving along different trajectories. One or more of the particular beam shape, azimuthal angle or solid angle may be adjustable in space and/or time, e.g. a beam being one or more of narrowed, widened, and redirected. Thus, an effective spatial emission profile of a directional transceiver may be provided as a time-average of a comparably narrow reciprocating signal beam. Also or alternatively an effective emission profile may be adjusted in response to a communication transmission strength, e.g. to "follow" a moving mobile communication device or "maintain line of sight" with a further communication module. Such adjustment may involve physical movement of at least part of an emitter or receiver, e.g. rotating an antenna and/or tilting a mirror, and/or it may involve adaptation of the emission profile itself, such as by means of beam forming technologies i.e. a signal processing techniques used in sensor arrays for directional signal transmission or reception. Beam forming is achieved by combining elements in an antenna array in such a way that signals at particular angles experience constructive interference while others experience destructive interference. Beamforming can be used at both the transmitting and receiving ends in order to achieve spatial selectivity. E.g. 5G signals may be formed as a narrow beam in a predetermined direction from a controlled combination of plural signals emitted by multiple antennas. Such multiple antennas may be integrated into a single device, e.g. being supported on, or even formed on, a single substrate. Similarly, an optical communication module may comprise a spatial light modulator for providing and/or adjusting a desired effective emission profile.

Preferably, (effective) emission profiles of multiple directional transceivers overlap and/or complement each other providing substantially continuous coverage across a field of view spanning more than 180 degrees in at least one plane around the communication module, preferably more than 270 degrees more preferably close to 360 degrees and the plane preferably being generally horizontal in case of a generally horizontal field of view or being generally vertical in case of a generally vertical field of view. Multiple planes may be used to specify a solid angle field of view. For example, a communication module may comprise multiple, e.g. four, antenna arrays as described in previous paragraph and each antenna array may cover a range of 90 degrees in horizontal plane, and 15 degrees in vertical plane. Further, depending on the intended mounting location and orientation of the luminaire relative to street level and relative to further luminaires or further communication modules, the orientation of the directional transceivers and the alignment of these transceivers with the transmissive parts in the mount and the luminaire housing may be selected to provide optimal communication coverage between the respective modules and possibly between the communication module and a mobile communication device.

The luminaire may comprise a mount for accommodating the communication module within the housing, wherein the mount is or comprises a thermal conductor and/or a metallic part, wherein the thermal conductor and/or metallic part is in thermal contact with at least part of a heat sinking element.

This may facilitate removal of excessive heat from the communication module to the heat sinking element. The thermal conductor could have a thermal conductivity of at least 20 W·m−1·K−1, preferably at least 50 W·m−1·K−1, more preferably at least 100 W·m−1·K−1. Also or in addition, the thermal conductor could comprise a heat pipe. The heat sinking element could be integrally formed with the thermal conductor and/or the metallic part. The heat sinking element could be part of the luminaire. E.g. a part of at least one of the luminaire housing, the communication module, the mount and the light module may comprise heat fins, which may be provided at least partly within the housing. Also or alternatively, the heat sinking element may be part of an element outside of the luminaire, e.g. a part of a street pole. A mount accommodating the light module within the housing may facilitate removal of excessive heat from the light module to the heat sinking element. Provision of a thermally conductive mount, for the communication module and/or the light module, in thermal contact with an external heat sinking element may facilitate at least part of the luminaire housing to be of a material having low thermal conductivity, e.g. plastics. Such thermally conductive mount may be the same as the mount mentioned above with respect to one or more transmissive housing parts and/or mount windows.

It is noted that "thermal contact" of two parts should be understood that the parts are configured for minimizing thermal resistance between the parts, e.g. the parts being unitary, the parts being in direct physical contact for a relatively large contact area, preferably on the order of a cross section size of at least one of the parts, and/or that, where the parts are physically separated, space between the parts is filled with a material having a high thermal conductivity such as one or more of a solder, a thermal contact paste and a so-called "gap pad".

At least part of the mount and/or the communication module may be arranged in the luminaire spaced from the luminaire housing, in particular a wall and/or a cover thereof, thereby enabling an air flow between the mount and/or communication module on the one hand and the luminaire housing on the other hand.

The air flow may assist cooling of the mount and/or the communication module. The air flow may be directed such that most, if not all, air flowing along an airflow path could come into contact with the mount and/or the communication module. The mount may also ensure the spacing between the mount and/or communication module on the one hand and the luminaire housing on the other hand; at least part of the mount may serve for supporting at least part of the luminaire housing at a predetermined distance from the mount or the communication module. Preferably, also the light module is, at least partly, spaced from at least part of the luminaire housing thereby accommodating at least some air flow between the light module and the at least part of the luminaire housing, which may enable cooling of the light module. Separate air flow paths may accommodate individual cooling. Note that the light module and/or communication module may comprise thermal conductors like a heat pipe to transport heat from "deeper lying" elements to an exterior of the respective module for cooling.

The mount and luminaire housing may be designed and positioned relative to each other to create a double-walled structure for accommodating at least part of the air flow between them.

The luminaire housing may comprise at least one air inlet and at least one air outlet allowing air from outside the luminaire to flow from the at least one air inlet through the space between the mount and/or communication module on the one hand and the luminaire housing on the other hand and to the at least one air outlet.

This facilitates cooling of structures in the luminaire with ambient/outdoor air. The air inlet and/or air outlet may be at least partly covered against weather influences such a water ingress. An air inlet may be adjacent to a reflector and/or to the light module.

In use, at least one air inlet may be positioned below at least one air outlet. Such luminaire may employ a chimney effect through the luminaire to sustain the air flow. In particular, at least part of the communication module and/or the light module may be arranged between the air inlet and the air outlet, wherein heat provided by the respective module may provide and/or increase the buoyancy-driven air flow. However, also or alternatively one or more fans and/or other devices may be provided outside or at least partly inside the luminaire housing to provide the air flow as a forced air flow through the luminaire housing.

At least part of the mount, the communication module, the light module and the housing may be shaped for one or more of generating, guiding and sustaining at least part of the air flow, e.g. being provided with an aerodynamic shape promoting funneling.

At least part of the mount may provide a wall separating at least part of the communication module from a housing wall, which may protect a thermally sensitive (e.g. thin plastic) housing wall part against radiated heat from the communication module. Such wall part may form a cooling fin if at least partly exposed to the air flow. The housing wall may be provided by a cover of the luminaire housing.

In the luminaire, the light source may comprise one or more light emitting diodes (LEDs). Also or alternatively, the light module may comprise a light source driver operably coupled with the light source, e.g. for driving the light source according to particular operation conditions.

The luminaire may comprise a power supply for providing power to both the light module and the communication module. The luminaire, in particular a light source driver thereof, may comprise one or more power stabilization systems for stabilizing incoming power (mains power) to a controlled supply power for powering the light source and/or the communication module which controlled supply power is at least one of transformed (e.g. changed voltage), stabilized (noise frequencies and/or fluctuation amplitude reduced), rectified (AC to DC) or inverted (DC to AC) with respect to the incoming power supply.

The light module may comprise a controller, also referred to herein as a lighting controller, operably coupled with the light source and/or with the light source driver, if provided, wherein the controller is configured for receiving and/or emitting one or more lighting communication signals associated with operation of the light module, such as light source status data and/or light source settings e.g. setting of power, colour and/or colour temperature of the light emitted by the light source, temperature of the light source, operation control (e.g. switching on/off of the light) and/or communicate maintenance information (e.g. electrical resistance of the light source). The controller may be configured for wireless receiving and/or emitting the lighting communication signals, wherein the lighting communication signals may be associated with, and/or be part of, one or more communication channels bypassing the communication module and its functions.

The communication signals transmitted or received by the communication module are electromagnetic wave signals and may comprise at least one of radio-frequency signals, millimeter-wavelength signals, and optical signals, for one or more of 4G, 4G-LTE, 5G, WiFi, and mm Wave communication, which may be in accordance with one or more communication standards. The communication signals may have a bandwidth of at least 100 Mbit/s, RF signal frequencies may be above 6 GHz. Note that lighting communication signals transmitted or received by a lighting controller as described above, such as for control of illumination power and/or colour of the light emitted or to be emitted from the light source, may only require low bandwidths and/or may suffice with high latency (e.g. slower dan 100 ms) and/or low signal to noise ratios, whereas the communication signals transmitted or received by the communication module may exhibit and/or require one or more of high bandwidths (e.g. >1 Gbps), low latency (e.g. <100 ms) and high signal to noise ratio, and that different bandwidths and/or signal speeds generally are associated with different hardware requirements.

The communication module may be configured for also cable-based transmitting and/or receiving further communication signals, linked to or independent from the communication signals mentioned otherwise and being also unrelated to the lighting function of the luminaire and/or to operation of the light module. The luminaire may have a data connection for connecting the communication module to a wired data network, such as via optical fiber, for exchanging data with a wired network or backhaul. Also or alternatively, the luminaire may have a data connection for connecting to one or more external communication modules and/or access points (e.g. a WiFi access point and/or other telecommunication access point). The communication module itself may also function as an access point and/or as a communication network node connecting to other nodes of a network provided by the communication module and a communication module of a further, possibly substantially identical, luminaire. The node provided by the communication module may also connect to a physical network, using cable or fiber. The communication module may also connect to an access point on a pole attachment or the communication module may be an access point itself. In particular in the latter case, the communication module may serve as a repeater and/or range extender for a network node of a particular network, e.g. a WiFi or 5G network. Then, rather than providing a part of neutral host backhaul network (e.g. for connecting WiFi, cameras, telecommunication equipment etc.), the communication module could relay telecommunication signals to other identical and/or similar communication modules and/or form part of a mesh network with identical and/or similar communication modules, the mesh network being connected to a telecommunication base, such as a 5G telecommunication tower.

The luminaire may be an outdoor luminaire.

Associated with the above, and exploiting any one of the presented benefits, a street light is provided comprising a pole and a luminaire as described herein. The pole may have a mast section and an arm laterally extending from the mast section, the luminaire being supported by the arm. "Supporting by the arm" may comprise upright supporting on the arm and/or suspending from the arm and/or mounting in the longitudinal direction of the arm. One street light may comprise plural luminaires as described herein, e.g. one light pole may have plural arms provided with such a luminaire. In such case, the communication module of one or more of the luminaires may be configured for emitting and/or receiving communication signals into/from particular directions e.g. associated with an arrangement of the luminaires on the street light, which may assist preventing one or more of spatial overlap, shielding and reflection of wireless signal paths.

Associated with the above, and exploiting any one of the presented benefits, a system is provided comprising a plurality of luminaires as described herein, wherein the communication module of at least one of the plurality of luminaires is configured for transmitting at least some of the communication signals to and/or receiving at least some of the communication signals from at least one other one of the plurality of luminaires.

Thus the communication modules in the luminaires may communicate with each other and form a network of communication nodes. In addition, one or more of the communication modules may be connected to a further communication node or to a physical network via one or more cables, such as fiber connection.

Therefore, there is also provided a lighting system comprising a plurality of luminaires with integrated communication infrastructure enabling (possibly public) wireless communication. The communication modules in the luminaire may provide a wireless access point to the network and/or may be a connection point for other wireless access points.

A system and/or street light disclosed herein may comprise a further luminaire having a substantially the same design and lighting functionality as a design and lighting functionality of a luminaires or plurality of luminaires disclosed herein, but being devoid of the communications module. Such further luminaire may thus comprise an identical housing and/or all luminaires and further luminaires having the same exterior and appearance.

Such system provides the above-described benefits but may reduce costs compared to a system where all luminaires are provided with a communication module. A density of luminaires desired or required for a particular illumination pattern may be significantly higher than a density of communication modules desired or required for a particular network connectivity, coverage and data volumes. By providing all luminaires with substantially the same design and lighting functionality the system obtains a uniform appearance which may benefit acceptance by (prospective) users.

The system may be cost effective by providing at least some of the disclosed luminaries in a network of luminaire, e.g. by adding the disclosed luminaries to the existing system and/or by replacing at least some of the luminaires already present in the existing system ("existing luminaires") with the disclosed luminaire and/or by adding communication modules to at least some of the existing luminaires, thus transforming or retrofitting them into luminaires described herein. Such retrofitting may transform an existing luminaire providing only lighting into a multi-functional luminaire providing lighting and public or private wireless communication functionality.

Retrofitting an existing luminaire comprising an existing light module and a luminaire housing may include removing at least part of the existing light module and replacing it with a light module comprising at least one LED-based light source and possibly a LED driver. It is noted that compared to a conventional lamp of a given optical output power, a comparable light module comprising one or more LEDs as a light source may generally occupy a smaller volume for the same (or even higher) optical output power, irrespective of the conventional lamp being an incandescent lamp, a fluorescent lamp or a gas discharge lamp. Thus replacing a conventional light module may therefore make space available in an existing luminaire housing for suitably accommodating the communication module.

Therefore, also included is a method of retrofitting a luminaire comprising a luminaire housing and an existing light module, the method comprising: replacing the existing light module with a light module comprising at least one LED-based light source, adding a communication module configured for wireless transmitting and/or receiving communication signals which are unrelated to the lighting function of the luminaire and/or to operation of the light module and such that the communication module is accommodated within the luminaire housing.

As part of the retrofitting, e.g. to improve communication signal transmission and reception, at least part of the existing luminaire housing may be provided with, and/or be replaced by, a transmissive housing part being transmissive for the communication signals, as discussed above. This may comprise modifying at least part of an existing luminaire housing, e.g. removing at least part of the existing luminaire housing and/or forming one or more apertures in a wall of the existing luminaire housing. Such apertures and/or other modifications may subsequently be covered by a new transmissive housing portion and/or a cover.

BRIEF DESCRIPTION OF THE DRAWINGS

The above-described aspects will hereafter be more explained with further details and benefits with reference to the drawings showing a number of luminaires by way of example.

FIGS. 1-3 show an example of a luminaire, wherein FIG. 1 is a partly cut-away perspective view, FIG. 2 is an exploded view and FIG. 3 is a perspective view of the luminaire without cover (see text below);

DETAILED DESCRIPTION OF THE EMBODIMENTS

Figure 1:
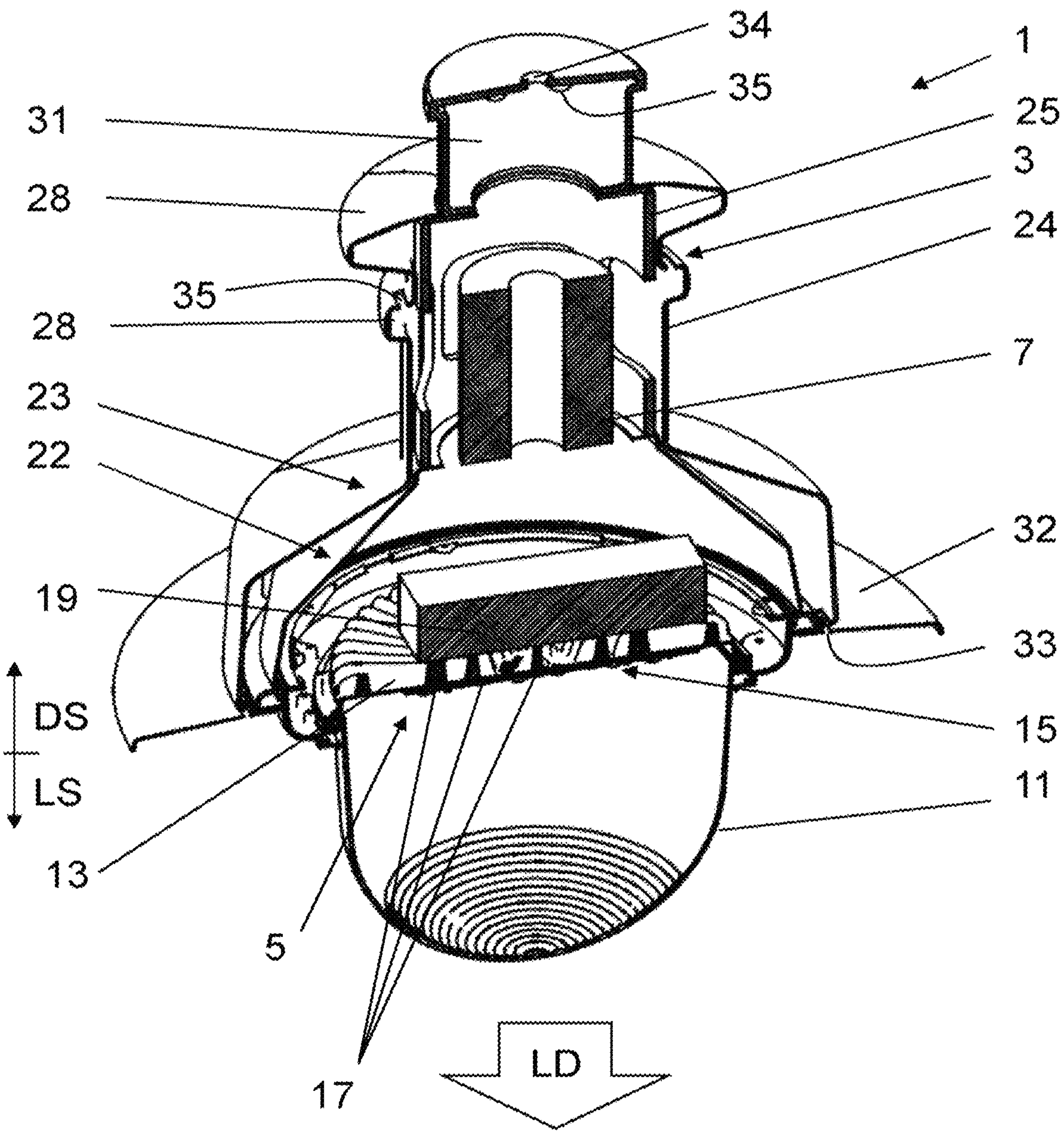

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, raised by hundreds (100, 200, etc.).

Further, unless otherwise specified, terms like "detachable" and "removably connected" are intended to mean that respective parts may be disconnected essentially without damage or destruction of either part, e.g. excluding structures in which the parts are integral (e.g. welded or molded as one piece), but including structures in which parts are attached by or as mated connectors, fasteners, releasable self-fastening features, etc.

Figure 2:
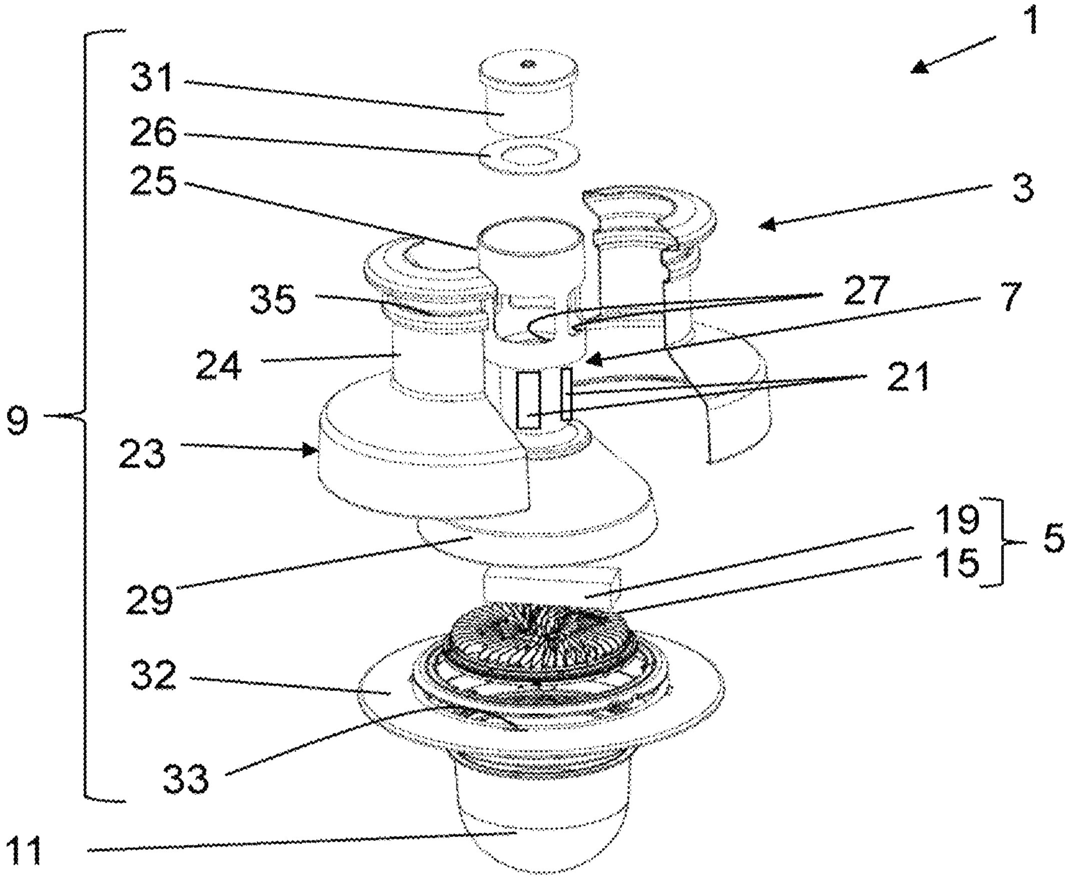
Figure 3:
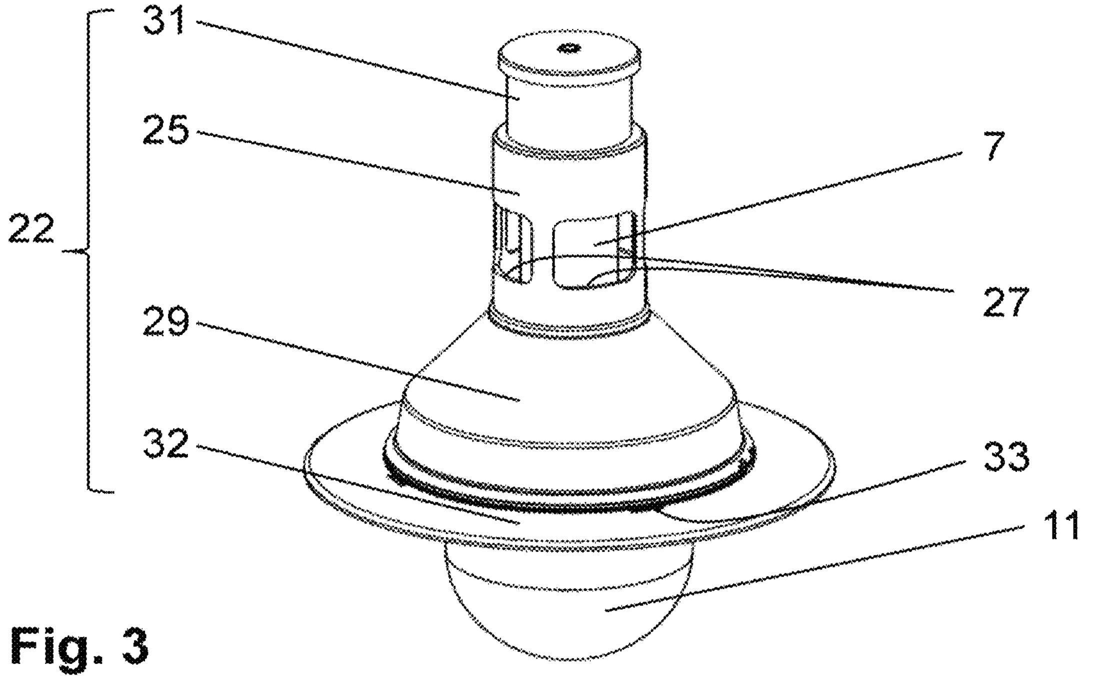

FIGS. 1-3 show an embodiment of a luminaire 1 comprising a luminaire housing 3, a light module 5, and a communication module 7.

The luminaire housing 3 comprises a base portion 9 and a lens 11 through which the light from the light module 5 is emitted.

The light module 5 is accommodated in the luminaire housing 3 and comprises a substrate 13 supporting a light source 15 here comprising a plurality of LEDs 17. The substrate 13 and light source 15 define a light emitting side LS of the light module 5. The assembly of the light source 15 mounted to the substrate 13 provides a light direction structure defining a light emission direction LD, pointing down in the Figures; note that the luminaire may be configured for providing light in a significantly wider solid angle than indicated with the arrow, possibly up to about $\pi$ or $2\pi$ steradians. The light module 5 further comprises a light source driver 19 arranged in the luminaire housing 3 at an opposite side DS of the light direction structure 19 relative to the light emission direction LD, opposite the light emitting side LS.

The communication module 7 is also accommodated in the luminaire housing 3, here in the base portion 9 thereof and at an opposite side of the light direction structure relative to the light emission direction LD. The communication module 7 is configured for wireless transmitting and/or receiving communication signals. For that, the communication module 7 comprises one or more of signal emitters, signal directors and signal receivers which may be integrated at least in part in a modem or other part of the communication module 7 and which are generally indicated with 21 in FIG. 2.

The base portion 9 of the luminaire housing 3 is shown, as an option, as a multipart housing portion and in the shown embodiment comprises a base structure 22 and an outer cover 23. The base structure 22 provides structural integrity to the luminaire housing 3. As shown, the cover 23, which may be formed in cover segments, covers at least part of the communication module 7 and of the base structure 22 protecting them from weather influences and/or hiding them from view when opaque. The cover 23 also provides transmissive housing parts 24 being transmissive for the communication signals. In particular, the transmissive housing parts 24 may be an integral part of the outer cover 23.

Best seen in FIGS. 2 and 3, the luminaire comprises a mount 25 for accommodating the communication module within the luminaire housing 3. In the shown embodiment, the mount 25 forms part of the base structure 22 of the luminaire housing 3. The mount 25 defines one or more mount windows 27, being transmissive for the communication signals. Here, the mount windows 27 are formed as apertures in the mount. When assembled, see FIG. 3, the communication module 7 is accommodated in the mount 25 such that each of the one or more of signal emitters, signal directors and signal receivers are aligned with a mount window 27, and with a transmissive housing part 24 when mounted in the luminaire housing. Thus, a signal path for the communication signals is defined. In the shown embodiment, the transmissive housing part 24 is formed as a thin-walled cylindrical portion about the communication module 5, wherein optional ribs 28 of the luminaire housing are arranged substantially out of the signal path of the communication signals to prevent local material thickness variations affecting signals transmission along the signal path.

The mount 25 may be, at least in part, of metal. The use of metal support structures within the luminaire to mount luminaire components provides robustness to the luminaire and allows the luminaire housing, especially the transmissive housing part 24, to be comparably thin without jeopardizing the structural integrity and robustness of the luminaire as a whole. Also, the mount may be thermally conductive and provide a large wall surface area for heat exchange. The mount 25 may be provided with heat fins (not shown).

In the shown embodiment, the mount 25 provides part of the base structure 22 of the luminaire 1: see FIG. 3.

The mount 25 may be mounted in close thermal contact with an optional skirt 29 of (the base structure 22 of) the luminaire housing 3 and/or, possibly via an optional flange 26, a top 31 of the luminaire housing 3. The skirt 29 and top 31 may therefore function as heat sinking elements. The luminaire may comprise further structures e.g. such as a screen 32 provided to the skirt 29. Also, the luminaire 1 may be mounted to a support such as a pole (not shown), e.g. supported from the top of the luminaire as a pendant (either via a clamp mechanism around top port 31 or via an optional mounting point 34), wherein at least part of the pole and/or a fixture between the pole and the luminaire 1 (e.g. the clamp mechanism mentioned above) may act as a, possibly further, heat sinking element. Thus, also when no communication module 7 is included in the mount 25, the luminaire housing 3 and light module 5 have the same look and feel and, except for some communication aspects, the same technical functionalities than the luminaire 1 which does comprise a communication module 7. Hence, the two types of luminaire (with and without communication module 7) may be interchanged otherwise.

Best seen in FIGS. 1 and 2, the communication module 7 is arranged in the mount 25 and spaced from the mount walls and from the luminaire housing 3. Thereby, an air flow is enabled between the communication module 7, the mount 25 and the luminaire housing, by which the communication module 7 may be cooled. Cooling may be further promoted by providing the luminaire housing, e.g. the cover, with one or more openings for functioning as air inlet 33 and, respectively, air outlet 35 and/or forming the cover at least partly from a material that is thin and/or has a high thermal conductivity.

In some cases, as part of a retrofit of an existing luminaire into a luminaire 3 as shown in FIGS. 1-3, the base structure 22 of the luminaire housing 3 may have been formed from an existing luminaire housing. E.g. the mount 25 may be formed from a part of the existing luminaire housing into which windows 27 have been formed, e.g. metal wall sections having been removed. Also or alternatively, the mount 25 may be formed as a new portion replacing part of the existing luminaire housing, e.g. in case the communication module 7 would not fit in the existing luminaire housing, whereas other parts of the luminaire (e.g. lens 11, screen 32, skirt 29, top 31) may have been retained. Thus, structural aspects like mechanical stability of the existing luminaire may, at least in part, be retained for the adapted and enhanced luminaire, whereas the cover 23 may serve for (re)establishment of weather proof features of the (thus adapted) luminaire 3, for which a comparably light weight cover 23 may be provided. Thus, one or more of material, manufacturing and/or assembling time, design calculations and costs may be saved compared to provisioning of a brand new luminaire 3. Also, the appearance of the existing luminaire may, at least in part, be retained, wherein optional ribs 28 and/or other ornaments on and/or in the cover 23 may serve for further mechanical stability of the (light weight) cover 23 and/or aesthetic functions and/or obscuring retrofitting adaptation and/or restoring design aspect ratios of the retrofitted luminaire 3 with respect to the existing luminaire as a possible consequence of "fattening" the luminaire with new components, such as a communication module. Thus public acceptance of the enhanced luminaires 3 (now including a communication module), in particular in historic towns, may be improved.

Figure 4:
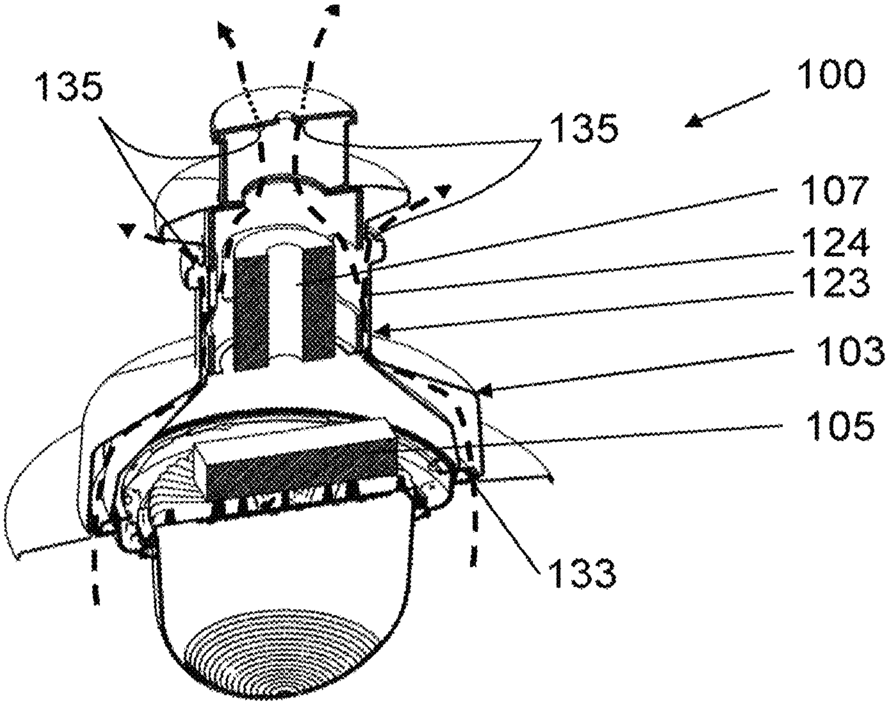
FIGS. 4-7 show different examples in cross section view.
Figure 5:
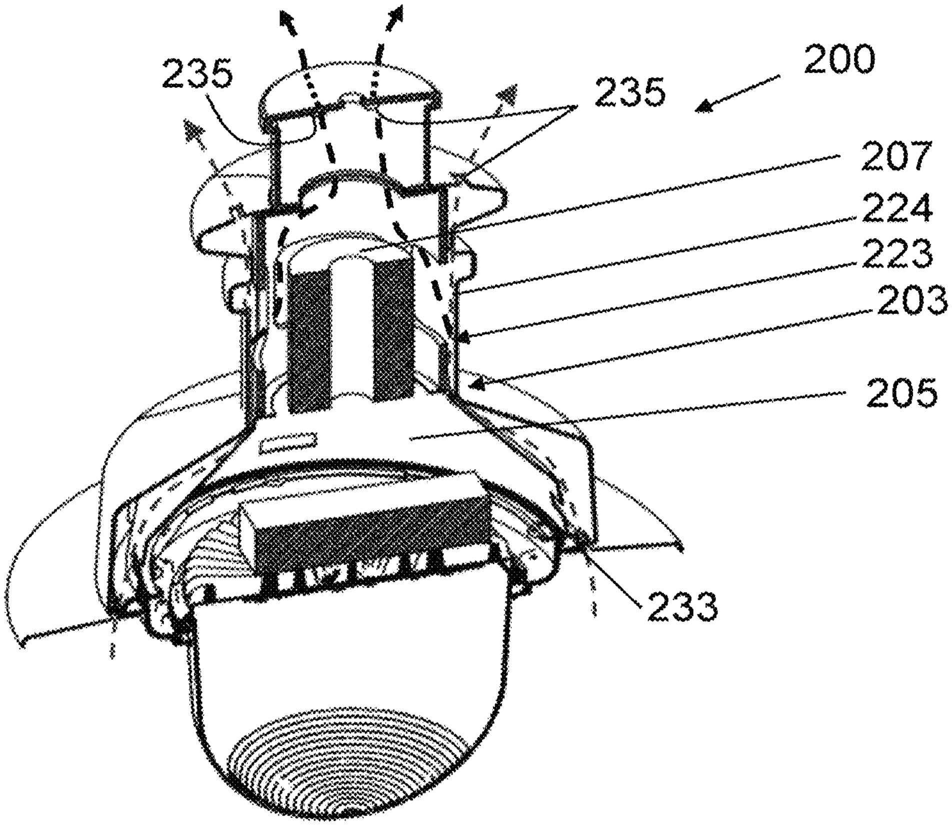
Figure 6:
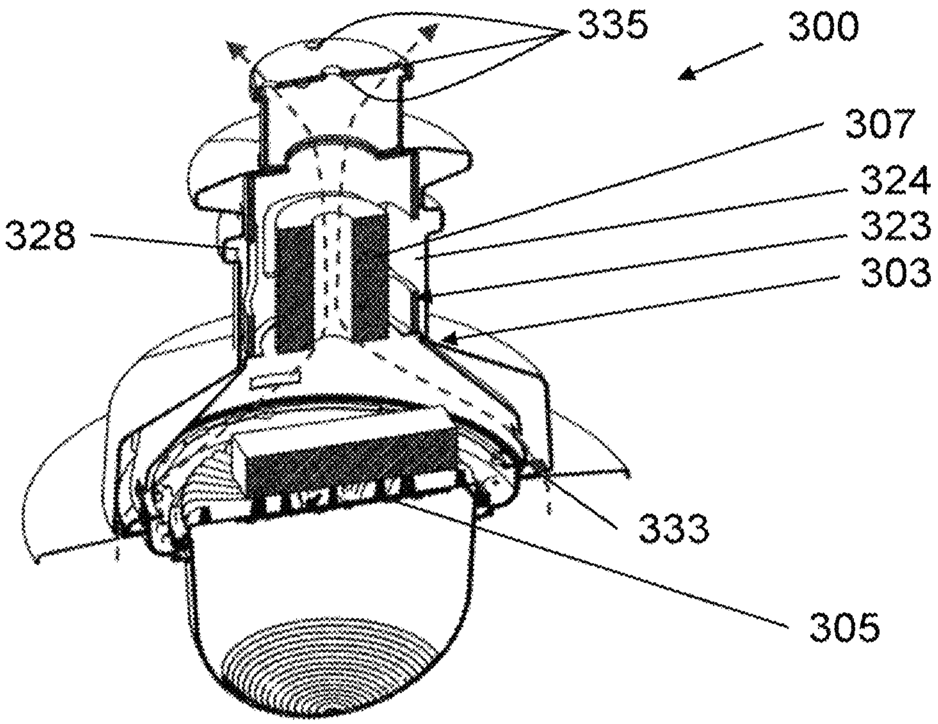

FIGS. 4-6 are cross section views of different embodiments of a luminaire 100, 200, 300, 400, largely similar to the luminaire 1 of FIGS. 1-3 and each comprising a respective luminaire housing 103, 203, 303, 403, light module 105, 205, 305, 405 and communication module 107, 207, 307, 407.

Figure 7:
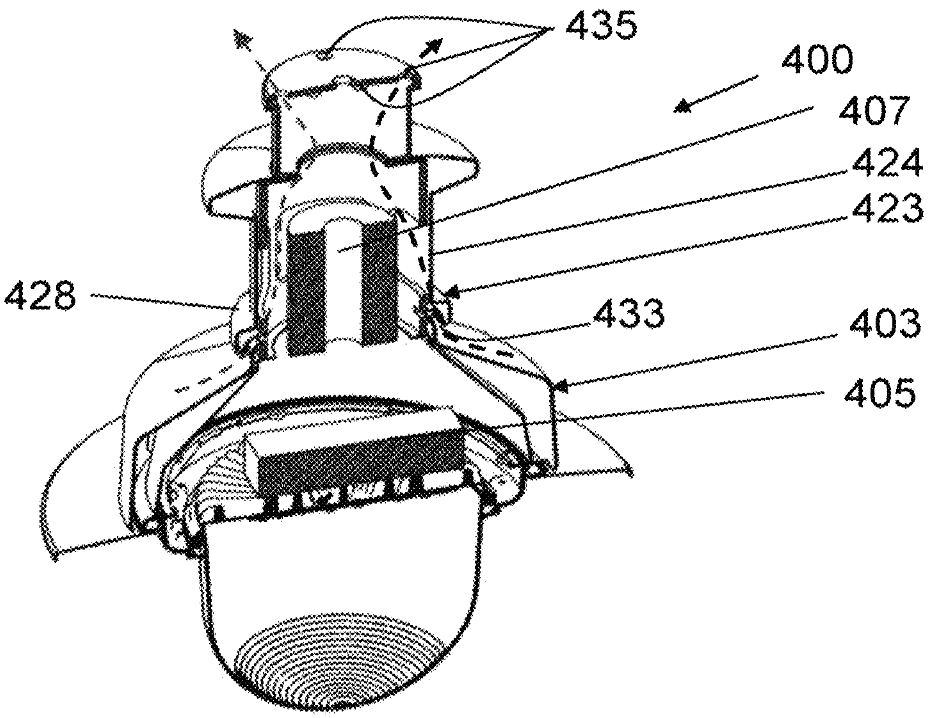

The different luminaires 1, 100, 200, 300, 400, differ mainly in that the luminaire housings 103, 203, 303, 403, of the respective luminaires have differently shaped covers covering the communication module and formed of transmissive housing parts 24, 124, 224, 324, 424 each being transmissive for the communication signals. Further, each of the different luminaires 1, 100, 200, 300, 400, is provided with one or more air inlets 133, 233, 333, 433 and one or more air outlets 135, 235, 335, 435 arranged in different positions facilitating an air flow through the respective luminaire 100, 200, 300, 400 as indicated with a dotted arrow. In some cases further apertures are provided in the light module 5 and/or the base structure 22, e.g. the skirt 29 thereof, to facilitate at least part of the air flow to pass through such apertures (FIGS. 5-6). In each of the shown cases, the air inlets 133, 233, 333, 433 are located below at least part of the respective communication module 107, 207, 307, 407, while the respective one or more air outlets 135, 235, 335, 435, are located above them, facilitating a chimney effect. The one or more air inlets 133, 233, 333, 433 and/or one or more air outlets 135, 235, 335, 435 and/or the position of one or more of them may be, as shown, at least in part defined by the cover 23; this simplifies providing luminaires 1, 100, 200, 300, 400, with different appearances (e.g. compare in FIGS. 4-5 the positions of the air outlets 135, 235 and in FIGS. 6-7 the positions of the air inlets 333, 433, and ribs 328, 428).

As indicated above, it is noted that luminaires exist which have an existing luminaire housing in the general shape of the base structure 22 shown in FIGS. 1-3; such luminaire may be retrofitted and transformed into a luminaire as provided herein (FIGS. 1-5) by replacing an existing light module with a light module comprising at least one LED-based light source, providing a communication module mounted into/onto a mount comprising transmissive window and replacing the existing luminaire housing with a new luminaire housing, which may have the same design or look and feel as the existing luminaire housing but having transmissive portions at least corresponding with the transmissive window(s) of the communication module mount. Alternatively, the existing luminaire housing may be reworked or retrofitted itself to include the transmissive portions.

Figure 8:
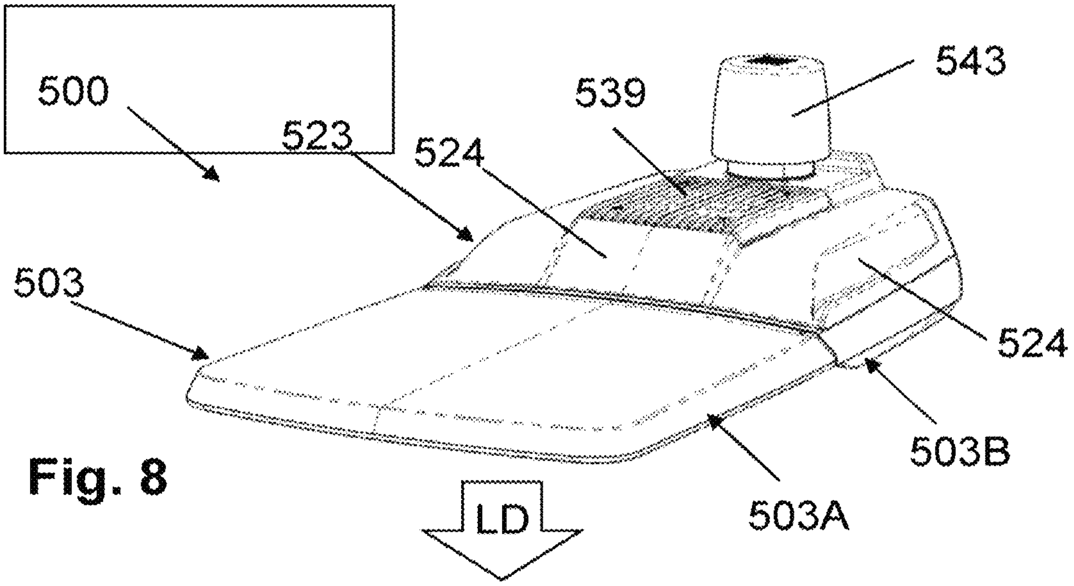
FIG. 8 is a perspective view of another example of a luminaire.
Figure 9:
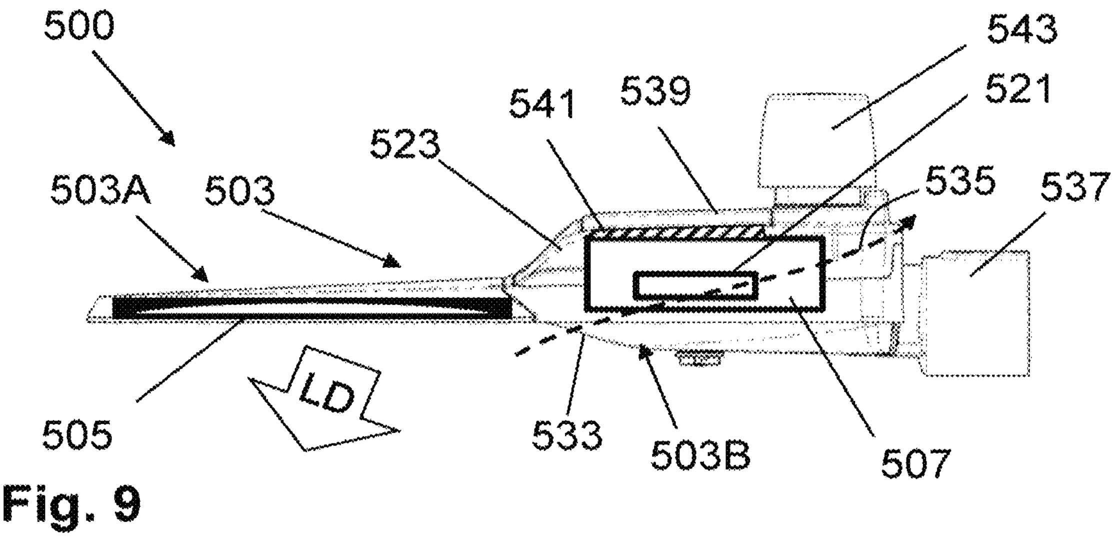
FIG. 9 is a partial cross section view of the luminaire of FIG. 8.
Figure 10:
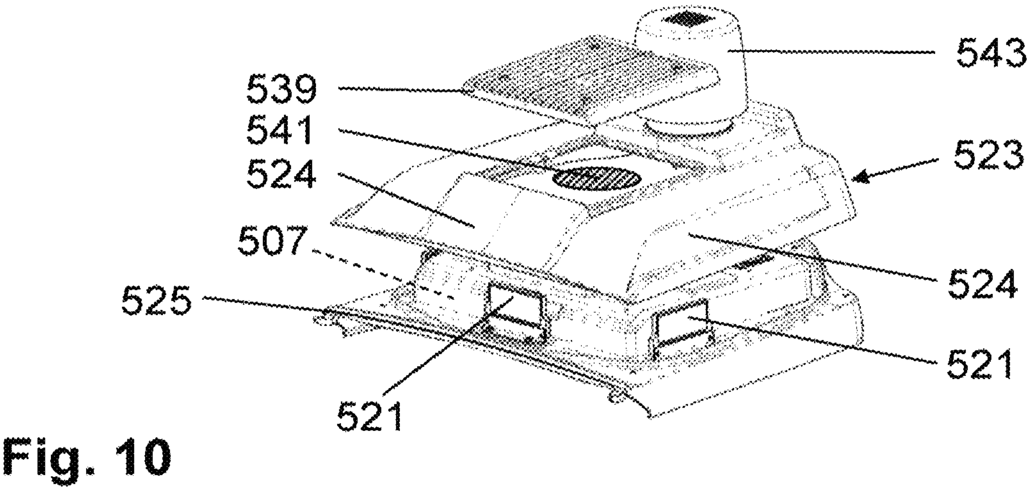
FIG. 10 is a partial exploded view of the luminaire of FIG. 8.

FIGS. 8-10 show as further embodiment of a luminaire 500. The luminaire 500 comprises comprising a luminaire housing 503 having a relatively slender portion 503A and a relatively bulky portion 503B. The luminaire 500 comprises, accommodated in the housing 503 a light module 505 and a communication module 507.

In the shown embodiment the light module 505 and the communication module 507 are arranged in part laterally adjacent each other, the light module 505 being arranged in the slender portion 503A and the communication module 507 being arranged in the bulky portion 503B at an opposite side of a light direction structure of the light module 505 relative to the light emission direction LD of the latter.

The luminaire 500 comprises a connector 537 for mounting the luminaire to (an arm of) a light pole (not shown). In the luminaire housing 503 a mount 525 is comprised made of a metal, e.g. aluminum or an alloy of that. In this embodiment, the mount 525 covers part of the communication module 507 and is arranged in close thermal contact with a heat sink 539 provided with heat fins and providing part of an outside surface of the luminaire 500 which may facilitate cooling of the communication module 507 mounted to the mount 525. The thermal contact may be promoted by placement of a thermal conductive substance, e.g. a “gap pad” 541 between the mount 525 and/or the communication module 507 and the heat sinking element 539.

The communication module 507 comprises one or more antennas 521. The antennas 521 are arranged outside of the mount 525 and such that, in a mounted position, they align with transmissive housing parts 524 in cover 523, the transmissive housing parts 524 being transmissive for the communication signals from/to (the antennas 521 of) the communication module 507. The antennas 521 may comprise antenna arrays, e.g. plural antenna modules formed on a circuit board.

The luminaire housing 503 comprises an air inlet 533 and an air outlet 535 facilitating an air flow through part of the luminaire housing 503 (dashed arrow in FIG. 10).

The luminaire 500 may comprise an optional further module 543, such as a sensor module (e.g. for any combination of weather, noise, vibration, tilt, image capture, air quality, photocell or any other sensor function), speaker, auxiliary light (for decoration, warning or signal function), active cooling unit, lighting controller and the like. The module 543 may be operably coupled with the light module 505 and/or the communication module 507.

Note that in a luminaire of the general design of the luminaire 500, at least parts of the light module 505 and of the communication module 507 may be arranged laterally adjacent each other in a slender portion 503A and/or in a bulky portion 503B respectively and/or vertically adjacent each other in the housing 503 (not shown); note that either module (505, 507) may comprise or even share one or more printed circuit boards for power elements and/or antennas allowing flexibility in placement of at least parts of the modules within the luminaire.

This disclosure is not restricted to the above described embodiments which can be varied in a number of ways within the scope of the claims. Elements and aspects discussed for or in relation with a particular embodiment may be suitably combined with elements and aspects of other embodiments, unless explicitly stated otherwise.

The invention claimed is:

1. A luminaire comprising a luminaire housing, a light module, and a communication module, wherein the light module comprises a light source for emitting light from the luminaire and wherein the light module is accommodated at least partly within the luminaire housing, wherein the communication module is configured for wireless transmitting and/or receiving communication signals which are unrelated to the lighting function of the luminaire and/or to operation of the light module and wherein the communication module is accommodated within the luminaire housing;

wherein the luminaire comprises a mount for accommodating the communication module within the housing, wherein the mount is or comprises a thermal conductor and/or a metallic part, and the thermal conductor and/or metallic part is in thermal contact with at least part of the communication module and at least part of a heat sinking element;

wherein at least part of the mount and/or the communication module is arranged in the luminaire spaced from the luminaire housing thereby enabling an air flow between the mount and/or communication module on the one hand and the luminaire housing on the other hand; and wherein the luminaire housing comprises at least one air inlet and at least one air outlet allowing air from outside the luminaire to flow from the at least one air inlet through the space between the mount and/or communication module on the one hand and the luminaire housing on the other hand and to the at least one air outlet.

2. The luminaire according to claim 1, wherein the light source is arranged at a light emitting side (LS) of the light module and the communication module is arranged in the luminaire housing opposite the light emitting side (LS) of the light module (5), the opposite side being opposite to the light emitting side (LS); and/or wherein the luminaire comprises a light directing structure defining a light emission direction (LD) and the communication module is arranged in the luminaire housing at an opposite side of the light direction structure relative to the light emission direction (LD).

3. The luminaire according to claim 1, wherein the mount defines one or more mount windows being transmissive for the communication signals; and each of the one or more of signal emitters, signal directors and signal receivers, the one or more mount windows, and the one or more transmissive housing parts are aligned.

4. The luminaire according to claim 1, wherein the luminaire housing comprises at least one air inlet and at least one air outlet allowing air from outside the luminaire to flow from the at least one air inlet through the space between the mount and/or communication module on the one hand and the luminaire housing on the other hand and to the at least one air outlet.

5. Luminaire according to claim 1, wherein at least one of the light source comprises one or more light emitting diodes (LEDs);

the light module comprises a light source driver operably coupled with the light source.

6. Luminaire according to claim 1, wherein at least one of the light module comprises a controller operably coupled with the light source or a light source driver operably coupled with the light source, wherein the controller is configured for receiving and/or emitting one or more lighting communication signals associated with operation of the light module;

the communication signals comprise at least one of radio-frequency signals, millimeter-wavelength signals, and optical signals, for 4G, 4G-LTE, 5G, WiFi, mm Wave communication;

the communication module is configured for also cable-based transmitting and/or receiving communication signals which are unrelated to the lighting function of the luminaire and/or to operation of the light module;

the luminaire) has a data connection for connecting the communication module to a wired data network;

the luminaire comprises a power supply for providing power to both the light module and the communication module; and the luminaire is an outdoor luminaire.

7. A street light comprising a pole and a luminaire according to claim 1.

8. A system comprising a plurality of luminaires according to claim 1, wherein the communication module of at least one of the plurality of luminaires is configured for transmitting at least some of the communication signals to and/or receiving at least some of the communication signals from at least one other one of the plurality of luminaires.

9. A luminaire comprising a luminaire housing, a light module, and a communication module, wherein the light module comprises a light source for emitting light from the luminaire and wherein the light module is accommodated at least partly within the luminaire housing, wherein the communication module is configured for wireless transmitting and/or receiving communication signals which are unrelated to the lighting function of the luminaire and/or to operation of the light module and wherein the communication module is accommodated within the luminaire housing;

wherein the luminaire comprises a mount for accommodating the communication module within the housing, wherein the mount is or comprises a thermal conductor and/or a metallic part, and the thermal conductor and/or metallic part is in thermal contact with at least part of the communication module and at least part of a heat sinking element; and wherein at least part of the mount and/or the communication module is arranged in the luminaire spaced from the luminaire housing thereby enabling an air flow between the mount and/or communication module on the one hand and the luminaire housing on the other hand;

wherein the luminaire housing comprises a transmissive housing part being transmissive for the communication signals; and wherein at least the transmissive housing part is opaque for visible light.

10. The luminaire according to claim 9, wherein the communication module comprises one or more of signal emitters, signal directors and signal receivers, wherein the luminaire comprises a mount for accommodating the communication module within the housing, such that each of the one or more of signal emitters, signal directors and signal receivers are aligned with the one or more transmissive housing parts.

11. Method of retrofitting an existing luminaire comprising a luminaire housing and an existing light module, the method comprising:

replacing the existing light module with a light module comprising at least one LED-based light source, adding a communication module configured for wireless transmitting and/or receiving communication signals which are unrelated to the lighting function of the luminaire and/or to operation of the light module and such that the communication module is accommodated within the luminaire housing adding a mount for accommodating the communication module within the housing, wherein the mount is or comprises a thermal conductor and/or a metallic part, and the thermal conductor and/or metallic part is in thermal contact with at least part of the communication module and at least part of a heat sinking element, wherein at least part of the mount and/or the communication module is arranged in the luminaire spaced from the luminaire housing thereby enabling an air flow between the mount and/or communication module on the one hand and the luminaire housing on the other hand; and providing at least one air inlet and at least one air outlet in the luminaire housing allowing air from outside the luminaire to flow from the at least one air inlet through the space between the mount and/or communication module on the one hand and the luminaire housing on the other hand and to the at least one air outlet.

12. A system according to claim 11, further comprising a further luminaire having a substantially the same design and lighting functionality as a design and lighting functionality of the plurality of luminaires according to claim 1 but being devoid of the communications module.

* * * * *